(12) United States Patent
Vivanco et al.

(10) Patent No.: US 9,392,485 B1
(45) Date of Patent: Jul. 12, 2016

(54) METHOD OF REDUCING PACKET LOSS IN A MULTIMEDIA BROADCAST AND MULTICAST SERVICES SYSTEM

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 143 days.

(21) Appl. No.: 14/099,869

(22) Filed: Dec. 6, 2013

(51) Int. Cl.
*H04L 12/26* (2006.01)
*H04W 28/02* (2009.01)
*H04W 4/06* (2009.01)

(52) U.S. Cl.
CPC ............ *H04W 28/0236* (2013.01); *H04W 4/06* (2013.01); *H04W 28/02* (2013.01); *H04W 28/0231* (2013.01); *H04W 28/0247* (2013.01)

(58) Field of Classification Search
CPC ......... H04L 47/10; H04L 47/35; H04L 47/30; H04L 47/32
See application file for complete search history.

(56) References Cited

U.S. PATENT DOCUMENTS

| | | | | |
|---|---|---|---|---|
| 8,130,776 | B1* | 3/2012 | Sundararajan | H04L 47/27 370/401 |
| 2005/0187960 | A1* | 8/2005 | Nomura | H04L 29/06027 |
| 2009/0154388 | A1* | 6/2009 | Jalloul | H04L 1/0003 370/312 |
| 2010/0110905 | A1* | 5/2010 | An | H04L 1/0002 370/252 |
| 2010/0125764 | A1* | 5/2010 | Kose | H03M 13/1171 714/704 |
| 2013/0051388 | A1 | 2/2013 | Pantelidou et al. | |

FOREIGN PATENT DOCUMENTS

WO 2010085212 A1 7/2010

* cited by examiner

*Primary Examiner* — Hassan Phillips
*Assistant Examiner* — Siren Wei

(57) ABSTRACT

Systems and methods for sending data packets to a wireless device are provided. An access node can determine a number of wireless devices in communication with the access node that meets a signal quality criteria. The access node can determine when the number of wireless devices that meets the signal quality criteria exceeds a threshold. The access node can receive from a content node first multimedia broadcast service (MBMS) data. The access node can encode the first MBMS data into second MBMS data when the number of wireless devices that meets the signal quality criteria exceeds the threshold. The encoding can be based on the number of wireless devices in communication with the access node that meets the signal quality criteria, a load at the content node, a load at the access node, and a bit error rate of each wireless device in communication with the access node.

17 Claims, 5 Drawing Sheets

METHOD OF REDUCING PACKET LOSS IN A MULTIMEDIA BROADCAST AND MULTICAST SERVICES SYSTEM

TECHNICAL BACKGROUND

Multimedia Broadcast and Multicast Services (MBMS) is a point-to-multipoint service in which data is transmitted from a single source to multiple destinations over a communication network in one or more consecutive sessions of finite duration. MBMS can be used in various applications such as mobile-TV, radio broadcasting, emergency alerts, etc. The successful reception of MBMS data at a wireless device can depend upon various factors such as signal quality. When a wireless device experiences a reduced signal quality, such as fading, packets can be lost during transmission of the MBMS data and a user can experience an undesirable deterioration in communication.

OVERVIEW

Systems and methods for sending data packets to a wireless device are provided. An access node can determine a number of wireless devices in communication with the access node that meets a signal quality criteria. The access node can determine when the number of wireless devices that meets the signal quality criteria exceeds a threshold. The access node can receive from a content node first multimedia broadcast service (MBMS) data. The access node can encode the first MBMS data into second MBMS data when the number of wireless devices that meets the signal quality criteria exceeds the threshold. The encoding can be based on the number of wireless devices in communication with the access node that meets the signal quality criteria, a load at the content node, a load at the access node, and a bit error rate of each wireless device in communication with the access node.

DETAILED DESCRIPTION

Figure 1:
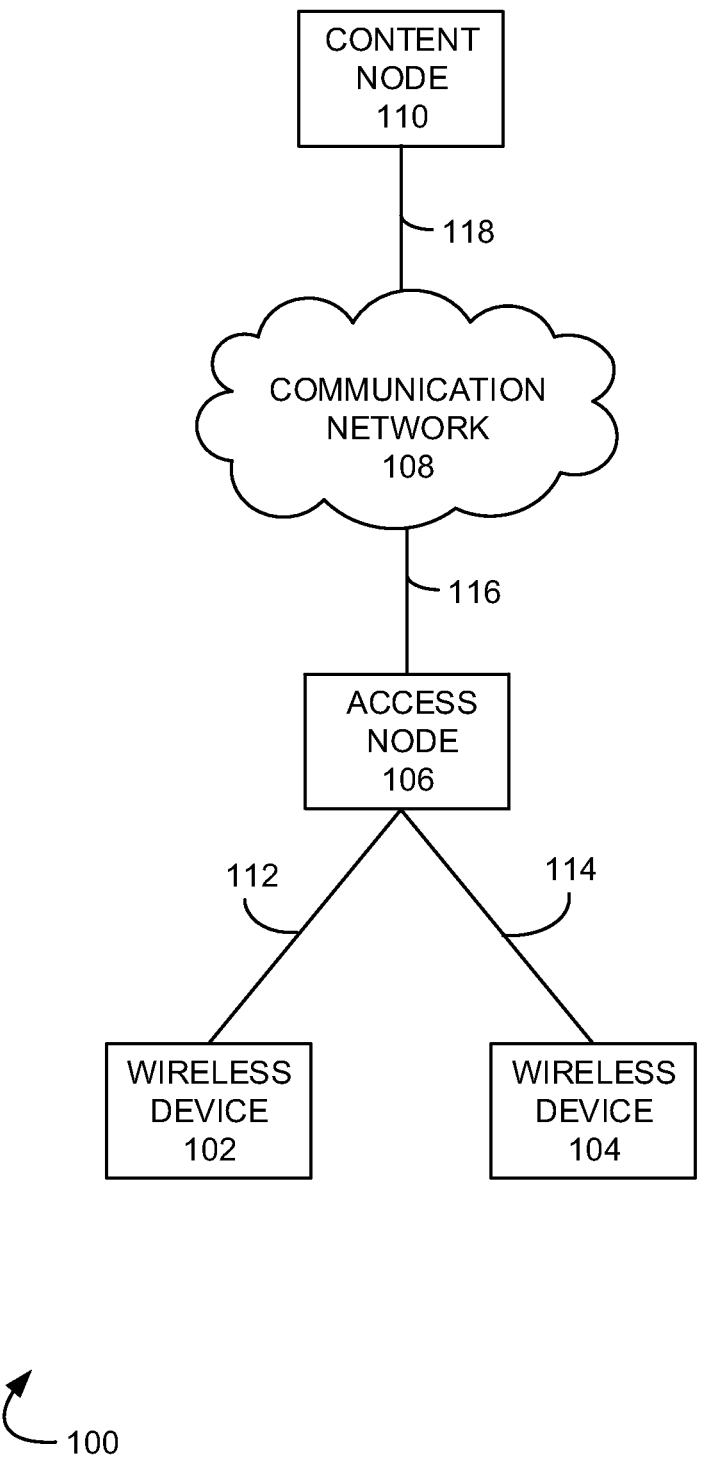
FIG. 1 illustrates a communication system to send data packets in a communication network.

FIG. 1 illustrates an exemplary communication system 100 for sending data packets in a communication network. Communication system 100 can comprise wireless devices 102, 104, access node 106, communication network 108, and content node 110. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between wireless device 102 and communication network 108, which are omitted for clarity, including additional processing nodes, routers, gateways, and physical and/or wireless data links for carrying data among the various network elements.

Wireless devices 102, 104 can be any device configured to communicate over communication system 100 using a wireless interface. For example, wireless devices 102, 104 can include a cell phone, a smart phone, a computing platform such as a laptop, palmtop, or a tablet, a personal digital assistant, or an internet access device, and combinations thereof. Wireless devices 102,104 can be configured to receive a multimedia broadcast multicast services (MBMS) signal. It is noted that while two wireless devices are illustrated in FIG. 1 as being in communication with access node 106, any number of wireless devices can be implemented.

The wireless interface of wireless devices 102, 104 can include one or more transceivers for transmitting and receiving data over communication system 100. Each transceiver can be associated with the same or different frequency bands, the same or different radio access technologies, the same or different network providers, and/or the same or different services. For example, wireless devices 102, 104 can include a transceiver that is associated with one or more of the following: MBMS, code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), etc.

Access node 106 can be any access node configured to communicate with wireless devices 102, 104. For example, access node 106 can be selected from a base transceiver station, a radio base station, an eNodeB device, or an enhanced eNodeB device.

Access node 106 can be configured to provide wireless communications to wireless devices 102, 104 using various wireless services such as voice, data, video, etc. For example, access node 106 can be configured to transmit data using a MBMS mode where MBMS modes can be used to provide downlink transmission services such as streaming services (e.g. multimedia, video on demand, webcast) or background services (e.g. warning messages, bulk e-mail, short message services (SMS), downloading, local information, advertisements) to a plurality of wireless devices.

Access node 106 can comprise a processor and associated circuitry to execute or direct the execution of computer-readable instructions to obtain information. Access node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 106 can receive instructions and other input at a user interface.

Access node 106 can communicate with wireless device 102 through communication link 112 and with wireless device 104 through communication link 114. Communication links 112, 114 can be a broadcast communication link such that multicast, unidirectional MBMS data can be transmitted from access node 106 to wireless devices 102, 104. While not illustrated for clarity, one of ordinary skill in the art would appreciate that wireless devices 102, 104 could be in further communication with access node 106 by establishing a unicast connection such that bi-directional information can be transmitted between each wireless device 102, 104 and access node 106. For example, wireless device 102 and/or wireless device 104 can communicate retransmission requests to access node 106 over the unicast connections.

Communication links 112, 114 can use various communication media, such as air, space, metal, optical fiber, or some other signal propagation path—including combinations thereof. Communication links 112, 114 can comprise many different signals sharing the same link. Communication links 112, 114 can also include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 106 could share the same representative wireless links 112, 114, but be transferred over different communication sessions, frequencies, timeslots, packets, ports, sockets, logical transport links—including combinations thereof.

Content node 110 can be any network node configured to provide MBMS content within system 100. For example, content node 110 can be a MBMS content provider such as an internet protocol (IP) multicast servicer coupled to an infrastructure such as a server via a data network. The content node 110 can provide MBMS data in various formats such as IP data packets. The MBMS data can be streaming services such as multimedia, video on demand, webcast. MBMS data can, alternatively or in addition to streaming services, include background services (e.g. warning messages, bulk e-mail, short message services (SMS), downloading, local information, advertisements).

Content node 110 can comprise a processor and associated circuitry to execute or direct the execution of computer-readable instructions to obtain information. Content node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Content node 110 can receive instructions and other input at a user interface.

While omitted for clarity, other nodes associated with MBMS services can be provided within system 100. For example, system 100 can further comprise a MBMS node to mediate between content providers and network operators such that the MBMS node formats control plane data and user plane data of the MBMS service where control plane data can be signaling data or control information such as control information associated with network interface or session management and user plane data can be payload data provided to the wireless devices 102, 104. Other MBMS nodes can authenticate and authorize content providers and/or service providers as well as transmit encrypted data. System 100 can further include nodes that provide information about its services for both service announcement and bearer setup purposes, authenticate a wireless device 102, 104 that wishes to join a multicast session, and initiate MBMS session start, modify, and stop signaling as well as provide other control and management functions for system 100. For example, system 100 can further include at least one of a multi-cell/multicast coordination entity (MCE), a mobility management entity (MME), an e-MBMS gateway, an evolved broadcast multicast service center (e-BM-SC), an authentication, authorization, and accounting (AAA) node, a rights management server (RMS), a subscriber provisioning server (SPS), a policy server, etc.

Access node 106 can be in communication with communication network 108 through communication link 116. Content node 110 can be in communication with communication network 108 through communication link 118. Communication links 116, 118 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 116, 118 can be a direct link or might include various equipment, intermediate components, systems, and networks.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying data, for example, to support voice and data communications by a wireless device such as wireless devices 102, 104. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

Various encoding schemes can be used in communication system 100. For example, packets can be encoded to mask packet loss during transmission from access node 106 to wireless devices 102, 104. In an exemplary embodiment, a coding scheme can be configured such that any node in the system 100 can extract information from one packet, mix it with information from other packets, and then generate another newly encoded packet to be transmitted to the next node in the system 100. The encoding node can create a plurality of linear combinations based on each packet that is received at the encoding node. The plurality of linear combinations can be based on a redundancy parameter. The redundancy parameter can be indicative of how many times each packet received at the encoding node is included within the plurality of linear combinations and/or the number of times the encoded packet associated with each linear combination is transmitted from the access node 106 to the wireless devices 102, 104. The receiver of the encoded packets can forward them as is or decode them after receiving enough encoded packets. In addition, decode packets can be transmitted where the decode packets can include decoding information within the packet header to help the network node receiving the encoded packet to reconstruct the original data packets. By using coding to mask packet loss, the coding scheme can minimize ordering of TCP sequences thereby reducing processing time because it eliminates the need to reorder the packets at the receiving node.

In operation, a network node can determine a number of wireless devices in communication with an access node that meets a signal quality criteria. The signal quality criteria can be based on at least one of channel quality associated with each wireless device, throughput associated with each wireless device, and a data rate associated with applications running on the wireless device. The network can determine how many wireless devices have a signal quality that meets the signal quality criteria. The access node can receive first multimedia broadcast service (MBMS) data. When the number of wireless devices that meets the signal quality criteria exceeds a threshold, the network node can encode the first MBMS data into second MBMS data and transmit the second MBMS data to wireless devices in communication with the access node.

In an exemplary embodiment, when a wireless device in communication with an access node experiences fading conditions, that wireless device can be determined to have a signal quality that meets a signal quality criteria. When a predetermined number of wireless devices in communication with an access node are considered to be in fading conditions and thus exceed a threshold, the network node can determine to encode the first MBMS data into the second MBMS data where the first MBMS data and the second MBMS data comprise different packets. The second MBMS data packets can comprise a greater payload than the first MBMS data packets.

The network node can encode the first MBMS data into the second MBMS data based on various factors such as the number of wireless devices in communication with the access node that meets the signal quality criteria, a load at the content node, a load at the access node, and/or a bit error rate of each wireless device in communication with the access node. For example, the load at the content node can be indicative of the number of packets associated with the first MBMS data. The load at the access node can be indicative of at least one of a number of wireless devices in communication with the access node, the application requirements of the wireless devices in communication with the access node, the types of communication links (e.g., unidirectional, bi-directional, etc.), etc. The bit error rate of each wireless device in communication with the access node could be indicative of current bit error rate and/or a past bit error rates such as driven by data. In addition, the bit error rate can be associated with application requirements such as minimum data rate required by an application running on an wireless device, a maximum permitted data delay, a minimum throughput, a minimum error rate, a maximum data loss rate, an application type, and a modulation and coding scheme and/or communication link characteristics such as received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR).

Figure 2:
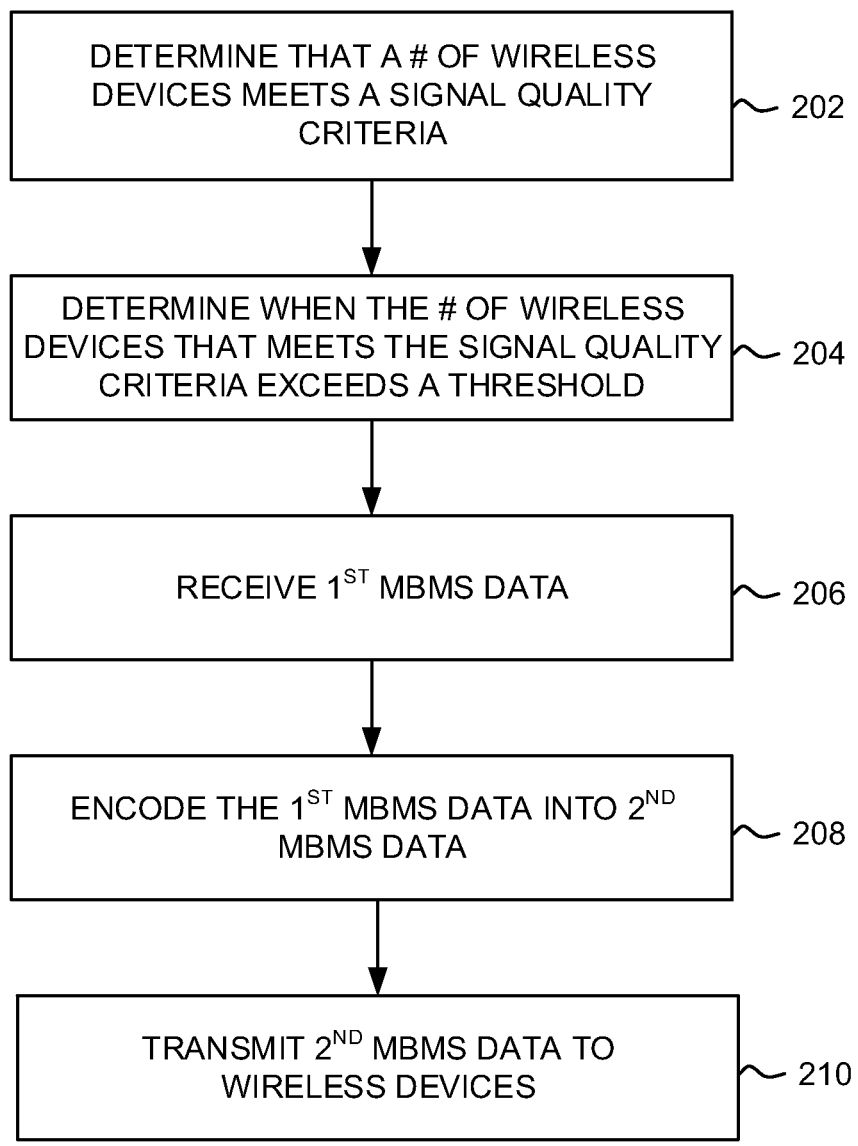
FIG. 2 illustrates an exemplary method of sending data packets in a communication network.

FIG. 2 illustrates a flow chart of an exemplary method of sending data packets to a wireless device in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a network node can determine that a number of wireless devices meets a signal quality criteria. For example, any network node such as access node 106 can determine the number of wireless devices in communication with the access node 106 as well as the signal quality associated with each wireless device. In an exemplary embodiment, the signal quality criteria can be indicative of reduced signal quality such as fading conditions. In other words, the access node 106 can determine whether the wireless device is experiencing packet loss based on at least one of channel quality, throughput, and data rate. When the signal quality associated with a wireless device meets the signal quality criteria, the access node can determine that the wireless device is experiencing packet loss.

The network node can then determine when the number of wireless devices that meets the signal quality criteria exceeds a threshold value at 204. For example, access node 106 can compare the number of wireless devices experiencing fading conditions with a predetermined threshold value. The predetermined threshold value can be indicative of a minimum number of wireless devices in communication with the access node that can experience fading conditions.

At 206, the network node can receive first MBMS data. For example, access node 106 can receive first MBMS data comprising a plurality of packets from content node 110. In an exemplary embodiment, the first MBMS data can comprise as a first packet (P1), a second packet (P2), and a third packet (P3). However, the first MBMS data can comprise any number of packets.

When the number of wireless devices that meets the signal criteria does not exceed the threshold value, the network node can transmit the first MBMS data to the wireless devices. For example, access node 106 can transmit the first MBMS data to wireless devices 102, 104 when the number of wireless devices in fading conditions does not exceed the threshold value.

When the number of wireless devices that meets the signal criteria exceeds the threshold value, the network node can encode the first MBMS data into second MBMS data at 208. The encoding can be based on the number of wireless devices in communication with access node 106, that meets the signal quality criteria, a load at the content node, a load at the access node, and a bit error rate of each wireless device in communication with access node 106 such as wireless devices 102, 104.

The network node can use various encoding schemes. In an exemplary embodiment, access node 106 can use linear network coding to encode the first MBMS data into the second MBMS data. For example, access node 106 can determine a packet encoding threshold such as a coding window. The packet encoding threshold can be based on a performance threshold such as an overall usage experience of all wireless devices in communication with access node 106. In addition, the performance threshold can be based on an application requirement of an application running on each wireless device in communication with access node 106. The access node can further determine a redundancy factor to achieve the performance threshold. The access node 106 can then encode the first MBMS data flow into the second MBMS data flow using a plurality of linear combinations where the plurality of linear combinations can be based on the packet encoding threshold and the redundancy factor.

In an exemplary embodiment, access node 106 can determine the packet encoding threshold to be three and a redundancy factor of five. Using a XOR coding operation, access node 106 can encode the first MBMS data flow comprising P1, P2, and P3 in the following linear combinations, where each linear combination is a resulting second MBMS packet:

(2P1+P2)
(2P2+3P3)
(3P1+2P2+2P3)
(P1+7P3)
(P2+5P3)

Each resulting second MBMS packet can be linearly independent. Based on the redundancy factor, access node 106 can further transmit 5 linear independent combinations of the first MBMS data flow, as shown above (note each equation is transmitted only once). When enough useful packets arrive at the wireless devices 102, 104, the wireless device can decode the second MBMS packets. For example, referring to the preceding example, encoder sends five linear equations with three variables, if two equations get lost during transmission and the wireless device receives three linear equations with three variables, the wireless device can decode the linear equations. Alternatively, a separate decode message associated with the second MBMS data can be transmitted and the access node 106 can instruct each wireless device that receives the second MBMS data to solve the linear combinations based on the decoding message. The decode message can comprise coefficients associated with the plurality of linear combinations of the number of packets of the first MBMS data used in the packet encoding threshold. The decode packets can include decoding information within the packet header to help the wireless device receiving the encoded packet to reconstruct the original data packets.

In an exemplary embodiment, when a large number of wireless devices in communication with access node 106 meets the signal quality criteria, when a load at the content server (either processing load or network load) is high, when a load at the access node is small, when the bit error rate for the wireless devices meeting the signal quality criteria is large, and the desired overall usage experience is below a target threshold, the packet encoding threshold can be determined to comprise a large number of packets of the first MBMS data and a large redundancy factor to improve the overall user experience for all wireless devices in communication with access node 106.

In another exemplary embodiment, when a small number of wireless devices in communication with access node 106 meets the signal quality criteria, when the load at the content server is low, when the load at the access node is high, when the bit error rate for the wireless devices meeting the signal quality criteria is small, and the desired overall usage experience is above a target threshold, the packet encoding threshold can be determined to comprise a large or small number of packets of the first MBMS data and a small redundancy factor can be determined to reduce unnecessary traffic load, while maintaining overall user experience for the wireless devices in communication with access node 106 above a target threshold.

Table 1 describes exemplary variables for determining packet encoding thresholds, redundancy factors, and/or performance thresholds. The values are prophetic, non-limiting examples in accordance with exemplary embodiments of the present disclosure associated with methods and systems of sending data packets in a wireless communication network.

TABLE 1

| $\Phi$ | $\Omega$ | BER for $\Phi$ | Redundancy Factor (R) | Estimated Overall MBMS Usage Experience |
|---|---|---|---|---|
| 30 | 100 | $10^{-6}$ | 5 | 90% |
| 50 | 100 | $10^{-6}$ | 5 | 83% |
| 50 | 100 | $10^{-6}$ | 7 | 90% |

In TABLE 1, $\Phi$ is associated with the number of wireless devices that meets the signal quality criteria and $\Omega$ is associated with the total number of wireless devices in communication with access node 106. The Estimated overall MBMS usage experience can be determined by: $((\Omega-\Phi)*100)+(\Phi*$losses due to fading conditions*BER improvement from encoding*100$)$. Base on the above table, when 30% of the wireless devices are experiencing fading conditions and the redundancy factor (R) is 5, the estimated overall MBMS usage experience can be determined to be 90%. The estimated overall MBMS usage experience can be indicative of the aggregated MBMS performance of all the wireless devices in communication with access node 106.

It is noted that while the previously described method is described as being performed within an access node, one of ordinary skill in the art would appreciate that the method could be performed at one or more various network nodes such as an access node, a controller node, a gateway, and/or any network node associated with the evolved packet core (EPC).

Figure 3:
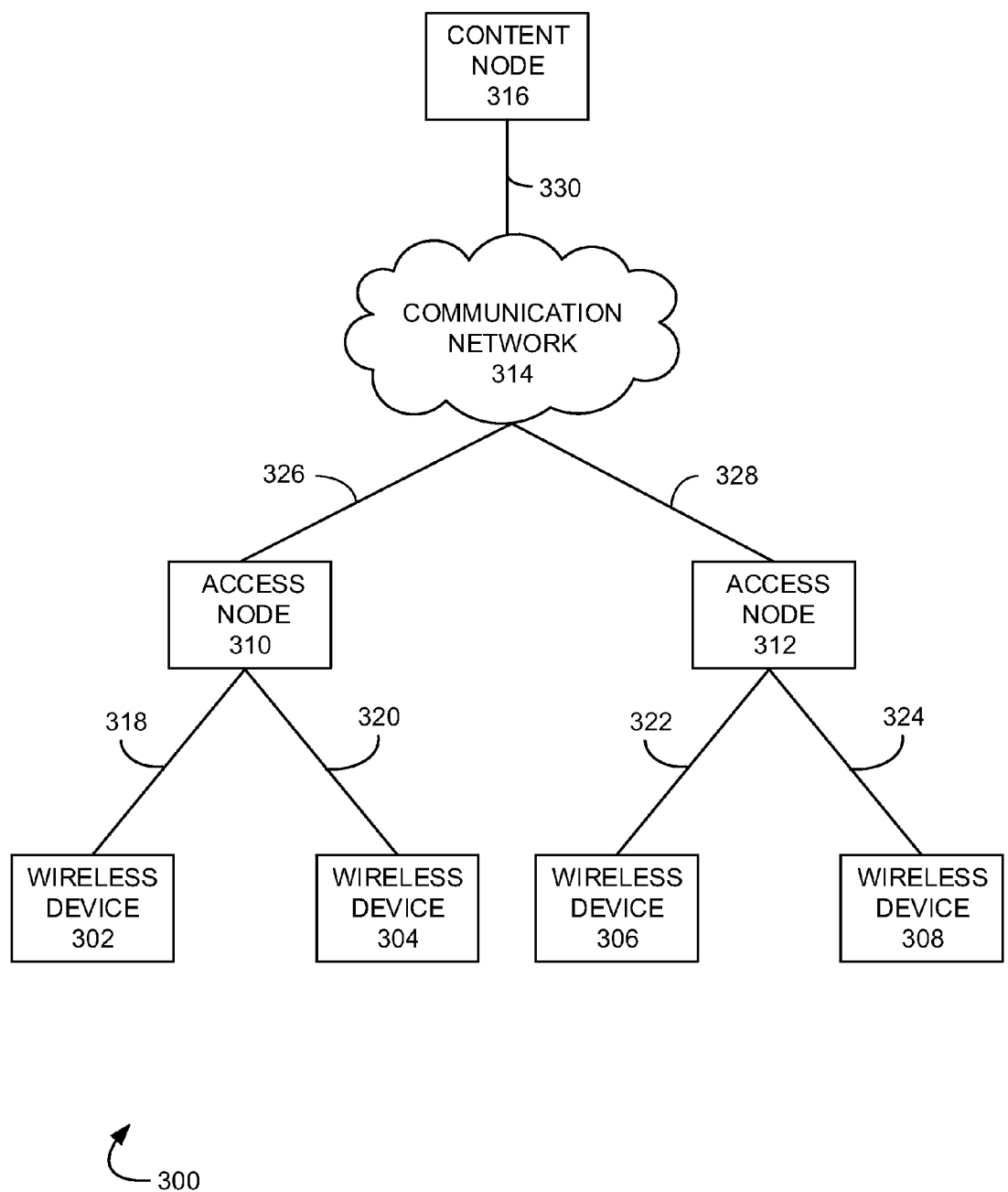
FIG. 3 illustrates another exemplary communication system to send data packets in a communication network.

FIG. 3 illustrates an exemplary communication system 300 for sending data packets in a communication network. Communication system 100 can comprise wireless devices 302, 304, 306, 308, access nodes 310, 312, communication network 314, and content node 316. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between wireless device 302 and communication network 314, which are omitted for clarity, including additional processing nodes, routers, gateways, and physical and/or wireless data links for carrying data among the various network elements.

Wireless devices 302, 304, 306, 308 can be any device configured to communicate over communication system 300 using a wireless interface. For example, wireless devices 302, 304, 306, 308 can include a cell phone, a smart phone, a computing platform such as a laptop, palmtop, or a tablet, a personal digital assistant, or an internet access device, and combinations thereof. Wireless devices 302, 304, 306, 308 can be configured to receive a multimedia broadcast multicast services (MBMS) signal. It is noted that while two wireless devices 302, 304 are illustrated in FIG. 3 as being in communication with access node 310 and two wireless devices 306, 308 are illustrated as being in communication with access node 312, any number of wireless devices can be implemented.

The wireless interface of wireless devices 302, 304, 306, 308 can include one or more transceivers for transmitting and receiving data over communication system 300. Each transceiver can be associated with the same or different frequency bands, the same or different radio access technologies, the same or different network providers, and/or the same or different services. For example, wireless devices 302, 304, 306, 308 can include a transceiver that is associated with one or more of the following: MBMS, code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), etc.

Access nodes 310, 312 can be any access node configured to communicate with wireless devices 302, 304, 306, 308. For example, access nodes 310, 312 can be selected from a base transceiver station, a radio base station, an eNodeB device, or an enhanced eNodeB device.

Access nodes 310, 312 can be configured to provide wireless communications to wireless devices 302, 304, 306, 308 using various wireless services such as voice, data, video, etc. For example, access nodes 310, 312 can be configured to transmit data using a MBMS mode where MBMS modes can be used to provide downlink transmission services such as streaming services (e.g. multimedia, video on demand, webcast) or background services (e.g. warning messages, bulk e-mail, short message services (SMS), downloading, local information, advertisements) to a plurality of wireless devices.

Access nodes 310, 312 can comprise a processor and associated circuitry to execute or direct the execution of computer-readable instructions to obtain information. Access nodes 310, 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 310, 312 can receive instructions and other input at a user interface.

Access node 310 can communicate with wireless device 302 through communication link 318 and with wireless device 304 through communication link 320. Access node 312 can communicate with wireless device 306 through communication link 322 and with wireless device 308 through communication link 324. Communication links 318, 320, 322, 324 can be a broadcast communication link such that multicast, unidirectional MBMS data can be transmitted from access nodes 310, 312 to wireless devices 302, 304, 306, 308. While not illustrated for clarity, one of ordinary skill in the art would appreciate that wireless devices 302, 304, 306, 308 could be in further communication with access nodes 310, 312 by establishing a unicast connection such that bi-directional information can be transmitted between each wireless device 302, 304, 306, 308 and access nodes 310, 312. For example, wireless device 302 and/or wireless device 304 can communicate retransmission requests to access node 310 over the unicast connections.

Communication links 318, 320, 322, 324 can use various communication media, such as air, space, metal, optical fiber, or some other signal propagation path—including combinations thereof. Communication links 318, 320, 322, 324 can comprise many different signals sharing the same link. Communication links 318, 320, 322, 324 can also include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 302, 304, 306, 308 and access nodes 310, 312 could share the same representative wireless links 318, 320, 322, 324, but be transferred over different communication sessions, frequencies, timeslots, packets, ports, sockets, logical transport links—including combinations thereof.

Content node 316 can be any network node configured to provide MBMS content within system 300. For example, content node 316 can be a MBMS content provider such as an internet protocol (IP) multicast servicer coupled to an infrastructure such as a server via a data network. The content node 316 can provide MBMS data in various formats such as IP data packets. The MBMS data can be streaming services such as multimedia, video on demand, webcast. MBMS data can, alternatively or in addition to streaming services, include background services (e.g. warning messages, bulk e-mail, short message services (SMS), downloading, local information, advertisements).

Content node 316 can comprise a processor and associated circuitry to execute or direct the execution of computer-readable instructions to obtain information. Content node 316 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Content node 316 can receive instructions and other input at a user interface.

While omitted for clarity, other nodes associated with MBMS services can be provided within system 300. For example, system 300 can further comprise a MBMS node to mediate between content providers and network operators such that the MBMS node formats control plane data and user plane data of the MBMS service where control plane data can be signaling data or control information such as control information associated with network interface or session management and user plane data can be payload data provided to the wireless devices 302, 304, 306, 308. Other MBMS nodes can authenticate and authorize content providers and/or service providers as well as transmit encrypted data. System 300 can further include nodes that provide information about its services for both service announcement and bearer setup purposes, authenticate a wireless device 302, 304, 306, 308 that wishes to join a multicast session, and initiate MBMS session start, modify, and stop signaling as well as provide other control and management functions for system 300. For example, system 300 can further include at least one of a multi-cell/multicast coordination entity (MCE), a mobility management entity (MME), an e-MBMS gateway, an evolved broadcast multicast service center (e-BM-SC), an authentication, authorization, and accounting (AAA) node, a rights management server (RMS), a subscriber provisioning server (SPS), a policy server, etc.

Access node 310 can be in communication with communication network 314 through communication link 326. Access node 312 can be in communication with communication network 314 through communication link 328. Content node 316 can be in communication with communication network 314 through communication link 330. Communication links 326, 328, 330 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 326, 328, 330 can be a direct link or might include various equipment, intermediate components, systems, and networks.

Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 can be capable of carrying data, for example, to support voice and data communications by a wireless device such as wireless devices 302, 304, 306, 308. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 314 can also comprise additional base stations, controller nodes, telephony switches, internet routers, network gateways, computer systems, communication links, or some other type of communication equipment, and combinations thereof.

Various encoding schemes can be used in communication system 300. For example, packets can be encoded to mask packet loss during transmission from access nodes 312, 312 to wireless devices 302, 304, 306, 308. In an exemplary embodiment, a coding scheme can be configured such that any node in the system 300 can extract information from one packet, mix it with information from other packets, and then generate another newly encoded packet to be transmitted to the next node in the system 300. The encoding node can create a plurality of linear combinations based on each packet that is received at the encoding node. The plurality of linear combinations can be based on a redundancy parameter. The redundancy parameter can be indicative of how many times each packet received at the encoding node is included within the plurality of linear combinations and/or the number of times the encoded packet associated with each linear combination is transmitted from the access nodes 310, 312 to the wireless devices 302, 304, 306, 308. The receiver of the encoded packets can forward them as is or decode them after receiving enough encoded packets. In addition, decode packets can be transmitted where the decode packets can include decoding information within the packet header to help the network node receiving the encoded packet to reconstruct the original data packets. By using coding to mask packet loss, the coding scheme can minimize ordering of TCP sequences thereby reducing processing time because it eliminates the need to reorder the packets at the receiving node.

In operation, a first network node, such as access node 310, can receive from a content node 316 first multimedia broadcast service (MBMS) data. Access node 310 can determine whether to encode the first MBMS data based on the number of wireless devices in communication with access node 310 that meets a signal quality criteria. The signal quality criteria can be based on at least one of channel quality associated with each wireless device, throughput associated with each wireless device, and a data rate associated with applications running on each wireless device. When the number of wireless devices that meets the signal quality criteria exceeds a threshold, access node 310 can encode the first MBMS data into second MBMS data. The encoding can be based on the number of wireless devices in communication with access node 310 that meets the signal quality criteria, a load at the content node, a load at access node 310, and a bit error rate of each wireless device in communication with access node 310. The access node 310 can transmit the second MBMS data to wireless devices in communication with access node 310 such as wireless devices 302, 304.

In addition, a second network node, such as access node 312, can also receive from content node 316 the first MBMS data. Access node 312 can determine whether to encode the first MBMS data into a third MBMS data based on the number of wireless devices in communication with access node 312 that meets the signal quality criteria where the third MBMS data is different from the first MBMS data. In addition, the third MBMS data can be the same or different from the second MBMS data depending on a packet encoding threshold at each access node. When the number of wireless devices in communication with access node 312 that meets the signal quality criteria does not exceed the threshold, access node 312 can transmit the first MBMS data to wireless devices in communication with access node 312 such as wireless devices 306, 308. In an alternative embodiment, access node 312 can encode the first MBMS data into the third MBMS data and transmit the third MBMS data to wireless devices in communication with access node 312 when the number of wireless devices in communication with access node 312 that meets the signal quality criteria exceeds the threshold.

In an exemplary embodiment, a network node can encode the first MBMS data into a second MBMS data or a third MBMS data. For example, each network node can determine a packet encoding threshold associated with the network node to achieve a performance threshold. The packet encoding threshold can comprise a number of packets of the first MBMS data. The network node can further determine a redundancy factor to achieve the performance threshold. The network node can then encode the first MBMS data into a second MBMS data or a third MBMS data using a plurality of linear combinations where the plurality of linear combinations can be based on the packet encoding threshold and the redundancy factor of the network node.

Figure 4:
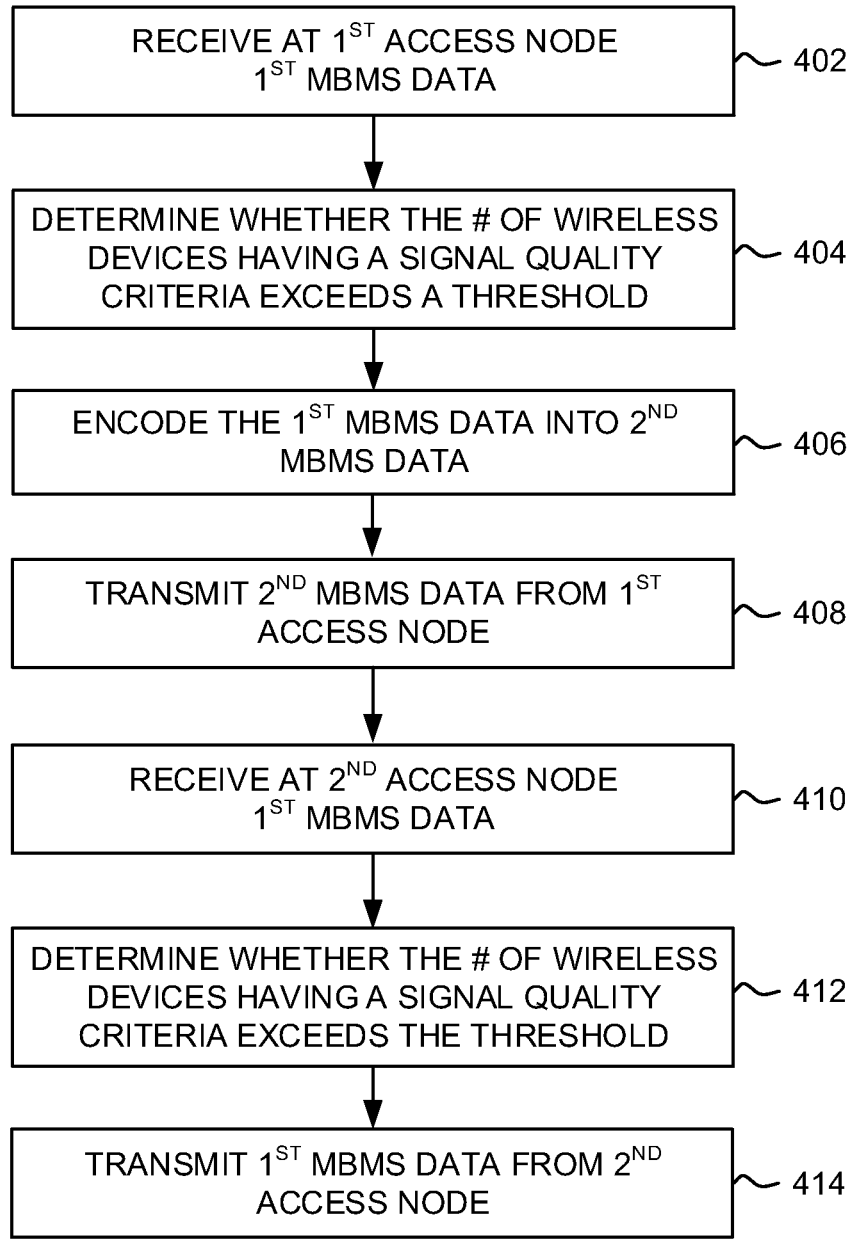
FIG. 4 illustrates another exemplary method of sending data packets in a communication network.

FIG. 4 illustrates a flow chart of an exemplary method of sending data packets to a wireless device in a wireless communication network. The method will be discussed with reference to the exemplary communication system 300 illustrated in FIG. 3. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 402, a first network node can receive first multimedia broadcast service (MBMS) data. For example, access node 310 can receive MBMS data from content node 316. The first network node can then determine whether to encode the first MBMS data into second MBMS data based on the number of wireless devices that meets a signal quality criteria at 404. For example, when the number of wireless devices in communication with access node 310 that meets the signal quality criteria exceeds a threshold, access node 310 can encode the first MBMS data into the second MBMS data at 406. The encoding can be based on the number of wireless devices in communication with access node 310 that meets the signal quality criteria, a load at the content node, a load at the access node, and a bit error rate of each wireless device in communication with access node 310. At 408, access node 310 can transmit the second MBMS data to the wireless devices in communication with access node 310.

At 410, a second network node can receive the first MBMS data. For example, access node 312 can receive the MBMS data from content node 316. The second network node can then determine whether to encode the first MBMS data into third MBMS data based on the number of wireless devices in communication with access node 312 that meets the signal quality criteria at 412. When the number of wireless devices in communication with access node 312 that meets the signal quality criteria exceeds the threshold, access node 312 can encode the first MBMS into the third MBMS. Alternatively, when it is determined that the number of wireless devices in communication with access node 312 that meets the signal quality criteria does not exceed the threshold, the access node 312 can transmit the first MBMS data to the wireless devices in communication with access node 312 at 414.

Figure 5:
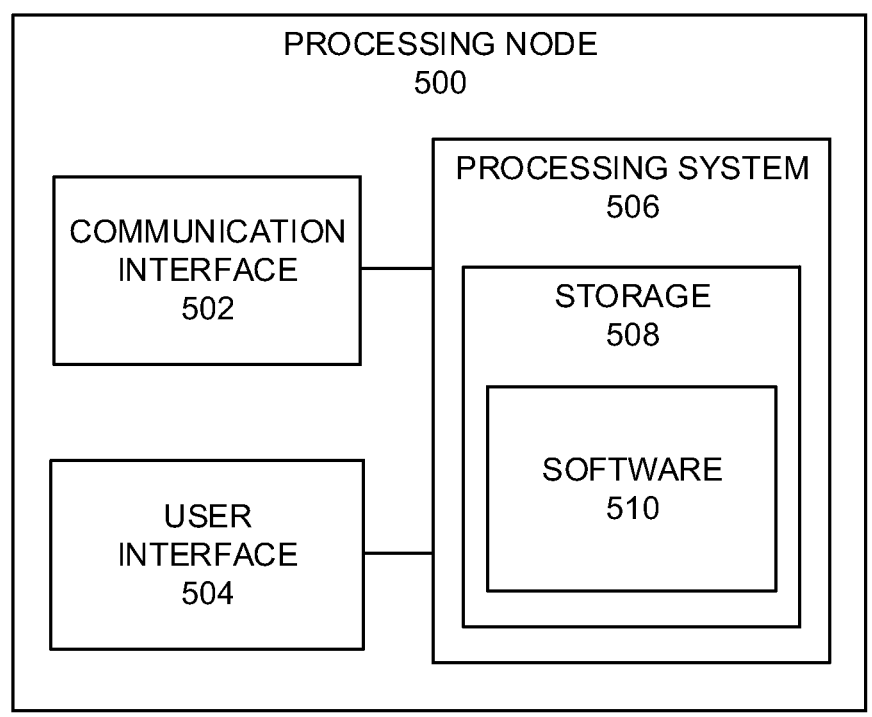
FIG. 5 illustrates an exemplary processing node according to an exemplary embodiment of the present disclosure.

FIG. 5 illustrates an exemplary processing node 500 in a communication system. Processing node 500 comprises communication interface 502, user interface 504, and processing system 506 in communication with communication interface 502 and user interface 504. Processing node 500 is capable of monitoring communications in a communication network. Processing system 506 includes storage 508, which can comprise a disk drive, flash drive, memory circuitry, or other memory device. Storage 508 can store software 510 which is used in the operation of the processing node 500. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access nodes 106, 310, 312, and content nodes 110, 316. Processing node 500 can also be an adjunct or component of a network element, such as an element of access nodes 106, 310, 312, and content nodes 110, 316. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of sending data packets to a wireless device, comprising:
    determining at an access node a number of wireless devices in communication with the access node that meets a signal quality criteria;
    determining at the access node when the number of wireless devices that meets the signal quality criteria exceeds a threshold;
    receiving at the access node from a content node first multimedia broadcast service (MBMS) data;
    encoding at the access node the first MBMS data into second MBMS data when the number of wireless devices that meets the signal quality criteria exceeds the threshold,
        wherein the encoding is based on the number of wireless devices in communication with the access node that meets the signal quality criteria, a load at the content node, a load at the access node, and a bit error rate of each wireless device in communication with the access node,
        wherein the encoding further comprises,
        determining a packet encoding threshold to achieve a performance threshold, wherein the packet encoding threshold comprises a number of packets of the first MBMS data, wherein the performance threshold is based on an association of the bit error rate with an application requirement of said each wireless device, and wherein the application requirement comprises a minimum data rate; and
    transmitting the second MBMS data to each wireless device in communication with the access node.

2. The method of claim 1, wherein encoding the first MBMS data into the second MBMS data further comprises:
    determining a redundancy factor to achieve the performance threshold; and
    encoding the first MBMS data flow into the second MBMS data flow using a plurality of linear combinations, wherein the plurality of linear combinations are based on the packet encoding threshold and the redundancy factor.

3. The method of claim 2, further comprising:
    transmitting a decoding message associated with the second MBMS data; and
    instructing each wireless device in communication with the access node to solve the linear combinations based on the decoding message.

4. The method of claim 3, wherein the decoding message comprises coefficients associated with the plurality of linear combinations of the number of packets associated with the packet encoding threshold.

5. The method of claim 2, wherein each linear combination is linearly independent.

6. The method of claim 1, wherein the signal quality criteria comprises at least one of channel quality, throughput, and data rate.

7. The method of claim 1, further comprising:
transmitting the first MBMS data to each wireless device in communication with the access node when the number of wireless devices that meets the signal quality criteria does not exceed the threshold.

8. A method of sending data packets to a wireless device, comprising:
receiving at a first access node from a content node first multimedia broadcast service (MBMS) data;
determining at the first access node whether to encode the first MBMS data based on a number of wireless devices in communication with the first access node that meets a signal quality criteria;
encoding at the first access node the first MBMS data into second MBMS data when the number of wireless devices that meets the signal quality criteria exceeds a threshold, wherein the encoding is based on the number of wireless devices in communication with the first access node that meets the signal quality criteria, a load at the content node, a load at the access node, and a bit error rate of each wireless device in communication with the first access node, wherein the encoding comprises determining a packet encoding threshold to achieve a performance threshold, wherein the packet encoding threshold comprises a number of packets of the first MBMS data, wherein the performance threshold is based on an association of the bit error rate with an application requirement of said each wireless device, and wherein the application requirement comprises a minimum data rate;
transmitting the second MBMS data to the wireless devices in communication with the first access node;
receiving at a second access node from the content node the first MBMS data;
determining at the second access node whether to encode the first MBMS data into third MBMS data based on a number of wireless devices in communication with the second access node that meets the signal quality criteria; and
transmitting the first MBMS data to the wireless devices in communication with the second access node when the number of wireless devices in communication with the second access node that meets the signal quality criteria does not exceed the threshold.

9. The method of claim 8, wherein encoding the first MBMS data into the second MBMS data further comprises:
determining a redundancy factor to achieve the performance threshold; and
encoding the first MBMS data flow into the second MBMS data flow using a plurality of linear combinations, wherein the plurality of linear combinations are based on the packet encoding threshold and the redundancy factor.

10. The method of claim 8, wherein the signal quality criteria comprises at least one of channel quality, throughput, and data rate.

11. A system for sending data packets to a wireless device, comprising:
a processing node configured to
determine a number of wireless devices in communication with the access node that meets a signal quality criteria;
determine when the number of wireless devices that meets the signal quality criteria exceeds a threshold;
receive from a content node first multimedia broadcast service (MBMS) data;
encode the first MBMS data into second MBMS data when the number of wireless devices that meets the signal quality criteria exceeds the threshold, wherein the encoding is based on the number of wireless devices in communication with the access node that meets the signal quality criteria, a load at the content node, a load at the access node, and a bit error rate of each wireless device in communication with the access node, wherein the encoding comprises determining a packet encoding threshold to achieve a performance threshold, wherein the packet encoding threshold comprises a number of packets of the first MBMS data, wherein the performance threshold is based on an association of the bit error rate with an application requirement of said each wireless device, and wherein the application requirement comprises a minimum data rate; and
transmit the second MBMS data to each wireless device in communication with the access node.

12. The system of claim 11, wherein the processing node is further configured to
determine a redundancy factor to achieve the performance threshold; and
encode the first MBMS data flow into the second MBMS data flow using a plurality of linear combinations, wherein the plurality of linear combinations are based on the packet encoding threshold and the redundancy factor.

13. The system of claim 12, wherein the processing node is further configured to
transmit a decoding message associated with the second MBMS data; and
instruct each wireless device in communication with the access node to solve the linear combinations based on the decoding message.

14. The system of claim 13, wherein the decoding message comprises coefficients associated with the plurality of linear combinations of the predetermined number of packets.

15. The system of claim 12, wherein each linear combination is linearly independent.

16. The system of claim 11, wherein the signal quality criteria comprises at least one of channel quality, throughput, and data rate.

17. The system of claim 11, wherein the processing node is further configured to
transmit the first MBMS data to each wireless device in communication with the access node when the number of wireless devices that meets the signal quality criteria does not exceed the threshold.

* * * * *